United States Patent
Catoe

(10) Patent No.: US 10,891,660 B1
(45) Date of Patent: Jan. 12, 2021

(54) SYSTEM AND METHOD FOR PROMOTION REIMBURSEMENT

(71) Applicant: ECR SOFTWARE CORPORATION, Boone, NC (US)

(72) Inventor: Peter Terry Catoe, Blowing Rock, NC (US)

(73) Assignee: ECR Software Corporation, Boone, NC (US)

( * ) Notice: Subject to any disclaimer, the term of this patent is extended or adjusted under 35 U.S.C. 154(b) by 638 days.

(21) Appl. No.: 14/730,647

(22) Filed: Jun. 4, 2015

Related U.S. Application Data

(60) Provisional application No. 62/007,509, filed on Jun. 4, 2014.

(51) Int. Cl.
*G06Q 30/00* (2012.01)
*G06Q 30/02* (2012.01)
*G06Q 20/18* (2012.01)

(52) U.S. Cl.
CPC ......... *G06Q 30/0273* (2013.01); *G06Q 20/18* (2013.01); *G06Q 30/0242* (2013.01); *G06Q 30/0268* (2013.01)

(58) Field of Classification Search
None
See application file for complete search history.

(56) References Cited

U.S. PATENT DOCUMENTS

| | | | |
|---|---|---|---|
| 5,581,064 A | 12/1996 | Riley et al. | 235/383 |
| 7,805,334 B1 | 9/2010 | Huppert | 705/16 |
| 7,805,383 B2 | 9/2010 | Veit et al. | 705/400 |
| 8,341,011 B2 | 12/2012 | Veit | 705/7.35 |
| 2001/0018665 A1* | 8/2001 | Sullivan | G06Q 20/20 705/14.65 |
| 2003/0177066 A1* | 9/2003 | Zhang | G06Q 30/02 705/14.23 |
| 2004/0210542 A1 | 10/2004 | Sweeney | 705/400 |
| 2006/0020512 A1* | 1/2006 | Lucas | G06Q 30/02 705/14.15 |

* cited by examiner

*Primary Examiner* — Meredith A Long
(74) *Attorney, Agent, or Firm* — MacCord Mason PLLC

(57) ABSTRACT

Improved checkout systems and methods for maintaining, managing and implementing promotion reimbursements are shown and described. Retailers may select promotion programs from a market place. Selected promotions are associated with the retailer's point-of-sale system. When an item within a promotion is detected, a promotion record may be formed. The promotion record may be automatically sent to a promotion originator based upon preset parameters for reimbursement.

8 Claims, 4 Drawing Sheets

SYSTEM AND METHOD FOR PROMOTION REIMBURSEMENT

BACKGROUND

The present invention relates generally to manufacturer/distributor promotions, and more particularly to systems and methods for managing electronic incentives, for example, discounts passed along to consumers and/or vendors by manufacturers/distributors.

Product manufacturers and distributors want to create and sustain consumer demand for their products. One tool, for example, used to create and sustain consumer demand is to provide a product to the consumer at a price that is perceived by the consumer to be a good value. A product offering which is perceived by the consumer as a good value, can often then convince the consumer to try a product for a first time. For example, a consumer may even switch brand allegiance from a competing product in favor of the better valued product. Once the consumer has tried the discounted product and has learned to appreciate the product benefits, then they may be more apt to pay a higher price for that same item in the future.

In many cases, manufacturers deliver products to the consumer by way of a distribution channel made up of several third parties. In such cases, several parties may have purchased an item through the chain, marked it up and then resold it to another, before it ends up on the store shelf, ready for purchase by the consumer. Each step in the distribution channel may cause the cost of the item to increase so that once the item eventually is placed on the shelf for consumer purchase, the price of the item may be set at a point too high to entice the consumer to purchase the item for a first time, or to entice the consumer to switch from a competing or favorite brand.

Often manufactures use discounts and incentives, directed at the distributor and/or retailer, to entice a larger purchase of product from the manufacturer. In some cases, the distributor will pass the discount along to the retailer and the retailer will do the same for the consumer, thereby growing demand for the product. However, the manufacturer has no way of insuring that the discount will actually be passed ultimately to the consumer. In some examples, the distributors and/or retailers may simply retain the savings instead of passing the savings along to the consumers. The discount, in such instances, does not make it to the consumer to entice the consumer to try or buy more of that particular discounted manufacturer's product.

To better insure that the consumer will receive the incentive discount provided by the manufacturer, manufactures will often issue vendor discounts, for example by way of coupons, for specific products directly to the consumer. Participating retailers, then in-turn, will accept these discount vendor coupons as a faun of payment from the consumer. The retailer is able to redeem the coupon with the manufacturer, often through still another third party, and the manufacturer then pays the retailer the value amount equal to the discount of the coupon. In this way, the manufacturer is sure that the discount is provided directly to the consumer, and the manufacturer is more in-control of proper distribution of the discounts. Such use of vendor coupons can be very complicated for the consumer, retailer and manufacturer. Consumers must keep track of the coupon, until such time when they will use it. The retailer must keep track of each coupon received and then do the necessary paperwork and redemption work to redeem the coupon for payment. The manufacturer is still subject to the possibility of fraud, as for example, the manufacturer has no way of verifying if the coupon was actually used to purchase the product intended for the discount.

Some manufacturers, for example tobacco and cigarette manufacturers, may increase product demand by using a discounting technique often called a "buy-down." A buy-down is typically an arrangement where the manufacturer or distributor coordinates with the retailer to reduce the retail price for a specific item and for a specific time period. In exchange for the reduced retail price, the manufacturer or distributor agrees to reimburse the retailer for the exact discounted amount provided to the consumer. In such cases, the retailer usually submits a report listing the number of units sold within the required time frame. The report is used by the manufacturer or distributor to compensate the retailer. The buy-down method is less tedious for the consumer because the consumer does not have to keep track of a vendor coupon, but they still receive the discount incentive. On the other-hand, the buy-down programs are similar to vendor coupons in that more effort is required by both the retailer and the manufacturer to process repayment. The buy-down program is still also similar to vendor coupons in that the manufacturer is still open to fraud and mis-reporting and has no real assurance that the correct items, or any items, were actually sold to the consumer. Vendor coupons and buy-down programs are increasingly harder to track and maintain as self-checkouts become more prevalent and improvements in the checkout process, such as scan tunnels and pay stations, increase the speed of the transactions. Applicant's inventions address these and other challenges in the art.

SUMMARY

The inventions disclosed fulfill one or more of these needs in the art by providing systems and methods for an improved checkout system for promotion reimbursement. In one example, a promotion reimbursement system is disclosed including a checkout station having a housing, a customer interface and a customer unloading station, and a point-of-sale system. The POS system having a microprocessor and memory operatively associated with one another to identify products being purchased, payments tendered therefor and to store transaction information. The microprocessor including a promotion module with programming adapted to document promotion execution in a transaction, develop a promotion execution record, and report the promotion record for reimbursement.

The checkout station is a self-checkout station in some examples. The system may include a portal scanner. The system may also include a pay station.

Other examples disclosed include a system for crediting promotion reimbursement to a promotion reimbursement account including a host computer with a programmable processor and storage unit. An item for purchase from a retail store includes an item identification information. The item identification is associated with a promotion reimbursement program account file stored in the storage unit of the host computer. The system includes an item identification information reader and a point of sale device. The item identification reader is in communication with the point-of-sale device and is configured to receive the item identification information from the item for purchase at the time of making a purchase transaction at the point-of-sale device. The point-of-sale device is configured to form a promotion record unique to the purchase transaction by combining the item identification information with a purchase transaction detail. The point-of-sale device may further be in communication with a host computer that is configured to receive a promotion record. The promotion record may be of and individual item, may be of related items, may be of items from different promotions related to the same originator and/or, by way of example, may be for one promotion or for a determine time period. The programmable processor is configured to determine the item for purchases identification information contained in the promotion record, determine the promotion reimbursement account file that is associated with the item identification information according to predetermined promotion conditions and promotions reimbursement programs in the promotion reimbursement account file. The system may allow a merchant to (a) identify prior to the purchase transaction a promotion program item for purchase, (b) apply a selected promotion to the purchase transaction, (c) record the applied promotion in an executed promotion reimbursement file record associated with a promotion originator, and (d) route an executed promotion record that is associated with a promotion originator to the originator.

In other examples, a system for managing reimbursements from originator promotions includes a POS checkout system having a store database, wherein the store database is associated with a promotion module, a promotion record function and a reimbursement function, and a requirements rules engine. The requirements rules engine may be in communication with the POS checkout system for executing promotion triggers and to associate the promotion with a product within the POS system. The engine is configured to internally monitor the applicability of the associated product to the promotion. A recordation component may also be included for providing a record of an executed promotion. A communication component may be included for informing an originator about an executed promotion within the record. A redemption component may also include allowing payment from the originator to the retailer.

The system may also be used in conjunction with a broker and/or third party broker.

The system may also include a promotions portal with a market place where originators provide promotions for retailers to select for execution of the promotions in consumer transactions to provide discounts to consumer for certain product purchases.

The disclosure also includes methods for controlling, managing and/or implementing a promotion reimbursement system. In one example, a method of controlling a promotion reimbursement system includes: offering a promotion portal with an online market place having promotional offers, associating a promotion module able to be in communication with a POS system when a promotion is selected from the market place, setting requirements rules in association with a promotion, providing a recordation component adapted to provide a record of an executed promotion, allowing a communication component to inform an originator about an executed promotion within the record, and associating a redemption component for allowing payment from the originator to the retailer.

A method of managing a promotion reimbursement system, in one example, includes:
offering a promotion portal with an online market place having promotional offers, associating a promotion module able to be in communication with a POS system when a promotion is selected from the market place, setting requirements rules in association with a promotion, providing a recordation component adapted to provide a record of an executed promotion, allowing a communication component to inform an originator about an executed promotion within the record, and associating a redemption component for allowing payment from the originator to the retailer.

In another example, a method for implementing a promotion reimbursement system, may include: selecting a promotion from a promotion portal with an online market place having promotional offers, allowing a promotion module to be in communication with a POS system when a promotion is selected from the market place, accepting requirements rules in association with a promotion, allowing a recordation component to provide a record of an executed promotion, allowing a communication component to inform an originator about an executed promotion within the record, and using a redemption component for allowing payment from the originator to the retailer.

These and other aspects of the present invention will become apparent to those skilled in the art after a reading of the following description of the preferred embodiment when considered with the drawings.

DESCRIPTION OF THE PREFERRED EMBODIMENTS

Figure 1:
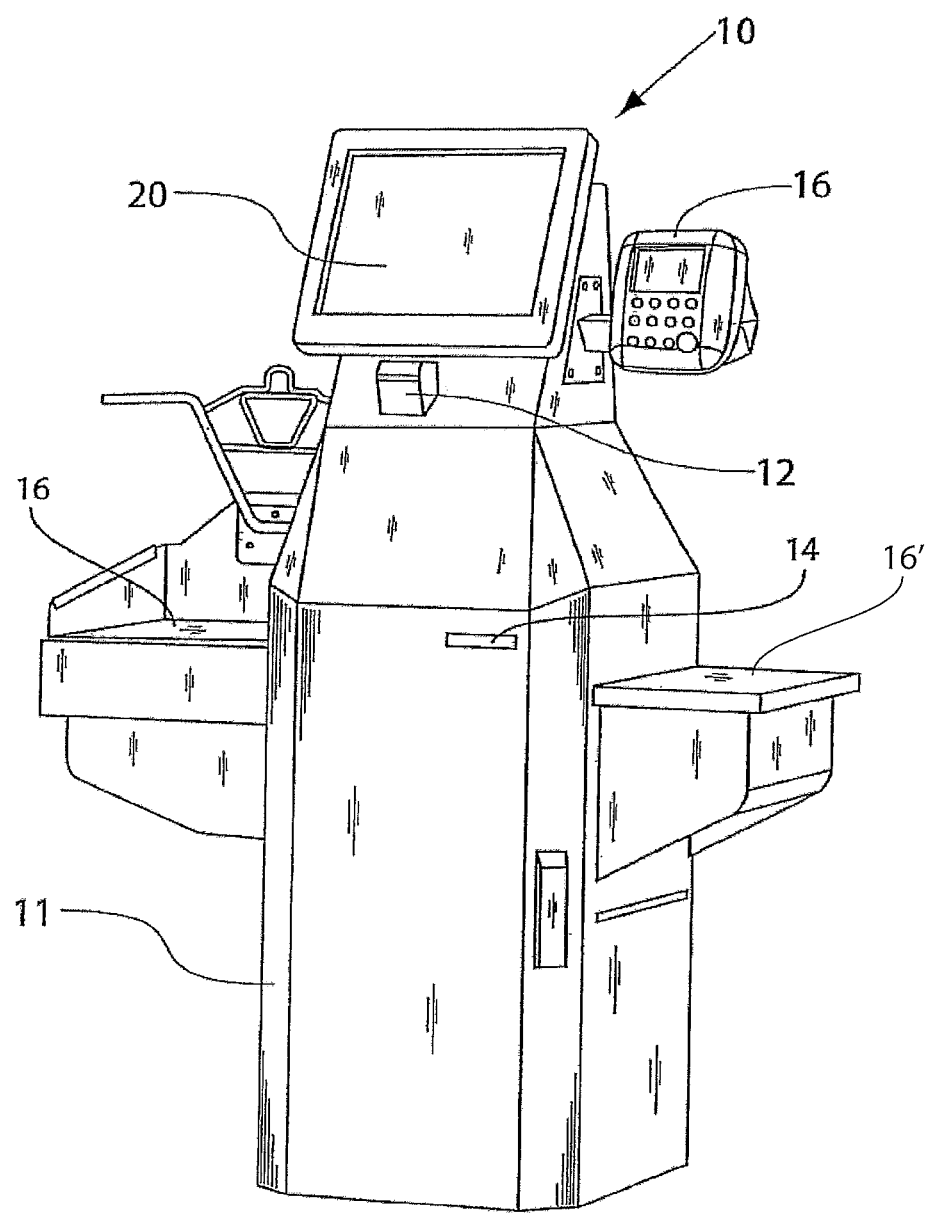
FIG. 1 is a front perspective view of one example of a self-checkout kiosk according to the disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms. It will be understood that the illustrations are for the purpose of describing an exemplary embodiment of the invention and are not intended to limit the invention thereto.

Retailers prefer to be as productive as possible with their checkout process. For this reason, retailers are most challenged to provide speed, accuracy and productivity within the checkout process. Coupons are widely used by consumers and may draw consumers to particular retailers. However, advancements associated with checkout transactions, such as electronic coupons, often come along with challenges to their implementation, recognition and reimbursement that affect speed, accuracy, productivity, customer satisfaction and efficiency of retailers. By way of example, one challenge associated with coupons is preventing coupon abuse, where a consumer may exceed the coupon use limits or use coupons with the wrong products. Additionally, consumers have difficulty finding coupons in order to use them at the time of the transaction, for example, finding them on their smart phone or remembering to bring the coupon they printed to the store for their purchase. Coupons are popular, however, may also represent an unacceptable investment of manual labor for retailers to process and receive reimbursement for the discounts/coupons associated with specific events and or products. Coupon maintenance is difficult and often is outsourced to third parties. There, however, remains substantial cost and complexity involved in having third party companies maintain coupon data. Retailers want to use promotions and discounts, however, they want to use them efficiently and productively so that consumers are attracted by the use of promotions but the retailer also wants to ensure reimbursement from use of the promotion without excessive backend documentation and workload.

Applicant's invention allows economical internalization of functions and components to the retailer's checkout system so that the challenges associated with maintaining and documenting discounts/coupons are minimized and retailers may keep records of coupon usage in-house with their Point-of-Sale (POS) system. In one example, a checkout system includes a checkout station having a housing, a customer interface and a customer unloading station, a POS system having a microprocessor and promotion module with programming adapted to document promotion execution in a transaction, develop a promotion execution record, and report the promotion record for reimbursement.

The promotion module may also include programming configured to automatically produce those retailer reimbursement records to a manufacturer for reimbursement.

The checkout system may be a traditional checkout or a checkout kiosk, and in other examples may be, but is not limited to, a self-checkout, a self-checkout kiosk, a hybrid-type scan tunnel checkout and/or a checkout paystation. Traditional checkouts are well-known in the art. FIG. 1 shows one example of a conventional automated self-checkout kiosk, generally designated 10. Typically, self-checkout systems include at least one kiosk. The kiosk usually includes a housing 11, which accommodates or houses the other aspects of the self-checkout system. The housing 11 may be a pre-existing structure at the installation site of the self-checkout system, may resemble the housing as shown in FIG. 1, or may take on other shapes able to accommodate the other aspects of the invention.

The kiosk may also include input modules 12, output modules 14 and transaction modules 16. The input module 12, as seen in FIG. 1 may be, for example, a coupon-in center, credit/debit card reader, or a payment center. The input module 12 may typically be supported on, integral to, or attached to the housing 11. Input module 12 is arranged to accept input about or for the transaction, for example, from items being purchased by recognizing the item, such as through selection on the display 20 by the customer or by recognition of an identification or code. A bar code scanner would be another example of an input module 12 suitably found in the kiosk. Other examples, inter alia, may include one or more keypads to key in information, RFID reader, a microphone potentially with voice recognition software, a touch screen keypad, a video camera, tablet computer, wireless communication receiver, a credit card reader, a debit card reader, a smart card reader, a loyalty card scanner, a cash receiver a wireless transmission, a mobile phone, and/or any of these in combination.

Output module 14, may include a coin-out center, a cash-out center and/or a receipt dispensing center associated with a change and receipt module 41. Output module 14 is arranged to provide and receive information during a transaction. Output module 14 may provide instructions to the purchaser or provide feedback from input received through input module 12. For example, the identification and recorded price of scanned items may be displayed to the customer on display 20. In the case of a touch screen display, purchasers may also input information on display 20 making the display serve as both a part of the input module 12 and output module 14. A speaker (not shown) may also serve to provide audio information to consumers. Other examples of output module 14 may include a private printing page, a link transmitting to a handheld device such as a mobile phone or tablet computer or the like.

Transaction module 16 may include centers accommodated by housing 11 where parts of the transaction occur, such as the bagger 16 and potentially an auxiliary bagger. Transaction module 16 may also include, by way of example, weigh centers, bumper guards or transaction shelving centers 16'.

Figure 2:
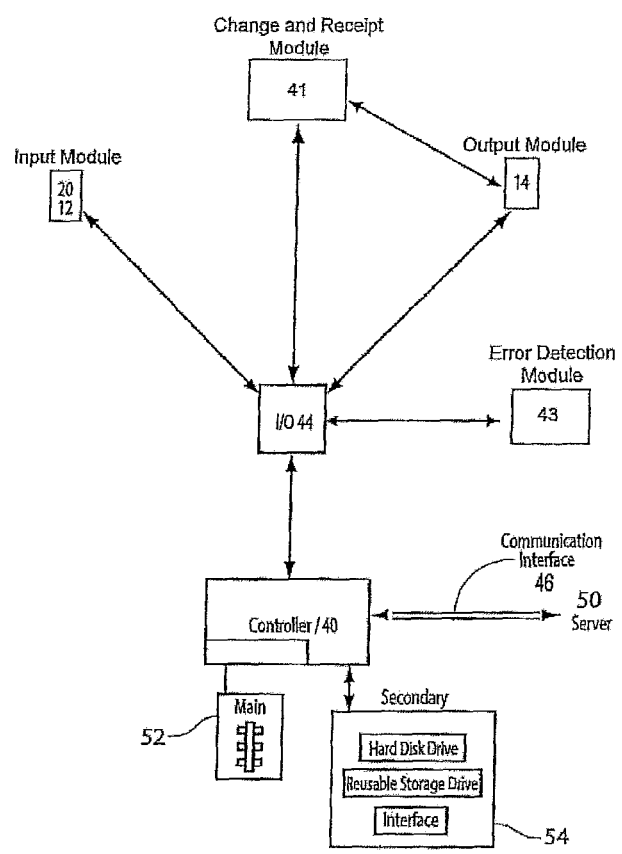
FIG. 2 is a schematic diagram showing one example of the controller and inputs and outputs of a checkout system according to the disclosure.

A checkout system may further include a POS computer system. The POS computer system may include a host computer having a controller/programmable processor 40 (as shown in FIG. 2), operatively connected to the input module 12 and output module 14. The controller has POS programming arranged to process information from the input module 12, such as the items being purchased in the transaction, and to provide information through output module 14 to the customer to allow completion of a customer transaction through system 10.

A controller 40, such as a microprocessor/programmable processor, may be, for example, in the kiosk and/or a store database computer, and usually includes an associated memory. The controller 40 connects through input/output ports 44 in order to receive information from and to provide information to the modules included in the kiosk. By way of example, the controller receives information from the input module 12 and provides data to the output module 14. The controller may have a clock component so that elapsed time between events can be determined Other configurations of times can be used.

Shown in FIG. 2, the POS computer system may include a main memory 52 or a secondary memory 54, or both, that may communicate with the controller. The main memory is generally a random access memory (RAM) that may include an item buffer for temporarily holding identification information corresponding to scanned items before the items are verified by the kiosk. On the other hand, the secondary memory with standard input/output ports may include any storage medium such as but not limited to a hard disk drive, a SCSI drive, a removable storage drive or removable storage units and interface. Alternatively, the secondary memory may include handheld computing devices, as well as, one or more databases such as a look-up database that includes SKU number, price, item codes, tolerance range for the item or for a class of items, and corresponding weight, height, length, or width for each item in the store. This database may reside on one or more of different or additional computers such as at a central store server 50 or a remote server outside of the location.

Additionally, it is contemplated that the kiosk may not include a main memory. In this situation, the controller may communicate with the secondary memory 54 which may be at a remote server, for example, accessed via a communication interface 46, for example, local area network or global networking such as the Internet or Intranet, and refresh a display screen with information and software stored in the remote server.

Unattended vending self-checkout systems may reside in employee break rooms or hospitals where staggered lunch shifts and work breaks cause several massive influxes of consumers at specific times throughout each work day. These influxes cause lines to form at the kiosks. It is not unusual for many of the consumers to have prepaid cards with stored value that is decremented with each purchase, and which the consumer may increment at their choosing using cash or credit at the kiosk.

Hybrid checkout technology may be made up of an Automated Scanning Device (ASD) station and/or a pay station, which may exist together or independently of each other. The consumer loads the merchandise he or she wishes to purchase onto a conveyor belt, which conveys the item through the ASD, where it is automatically scanned. As the item is conveyed out of the ASD, the attendant bags the item. Once all items are bagged, the consumer may proceed to an unattended pay-station. There the consumer can resume the transaction and scan or accept any corresponding vendor coupons, store coupons, as well as scan, enter, and/or project RFID to associate their customer identifier, which provides any other additional benefits offered to the consumer such as special pricing or loyalty rewards. Additionally, the consumer can also make changes to their account such as selecting options to receive their receipts by way of email, selecting options to opt out of printed receipts, opt in for marketing specials, and update their mailing and email address. One example of a scan tunnel is seen in U.S. patent application Ser. No. 12/283,439 to Zhu as published U.S. Patent Publication 2009/0134221, the Zhu application being incorporated herein in its entirety. Yet another example of a scan tunnel checkout is the Scan Portal offered by Datalogic®.

Advancements in checkout technology now offer alternatives to retailers seeking improvement in the efficiency of and consumer satisfaction with checkout transactions. However, variable checkout scenarios are being implemented and some retailers may have a traditional checkout and a self-checkout in the same store. Implementing improvements, such as offering electronic coupons, may become even more difficult as stores adopt the developing checkout technologies.

Applicant's checkout system allows internal control and recordation, along with the POS system, of coupons and discounts regardless of the checkout scenario. In some examples, a promotion module 68 is generally in communication with the retailer/store host computer and computer database and includes programming configured to allow application of electronic coupons internally to the POS checkout system. The promotion module 68 may be integral with the store database, downloaded or in remote communication with the store database at a server. Internal control of the promotion module 68 allows retailers to control distribution of the promotions and also to automatically document promotion and discounts associated with certain products.

Figure 3:
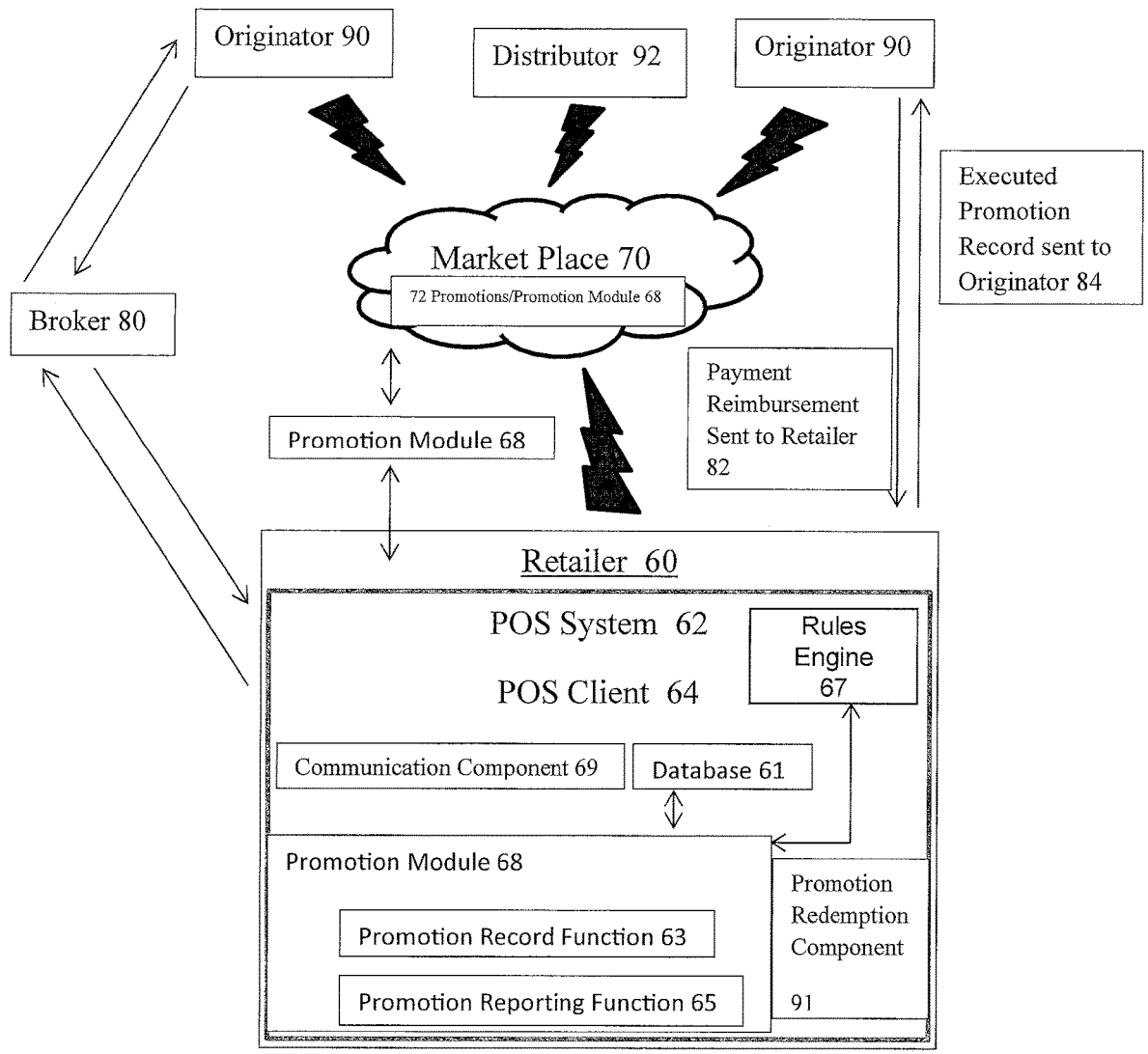
FIG. 3 is one example of a checkout system with promotion reimbursement according to one embodiment of the disclosure.
Figure 4:
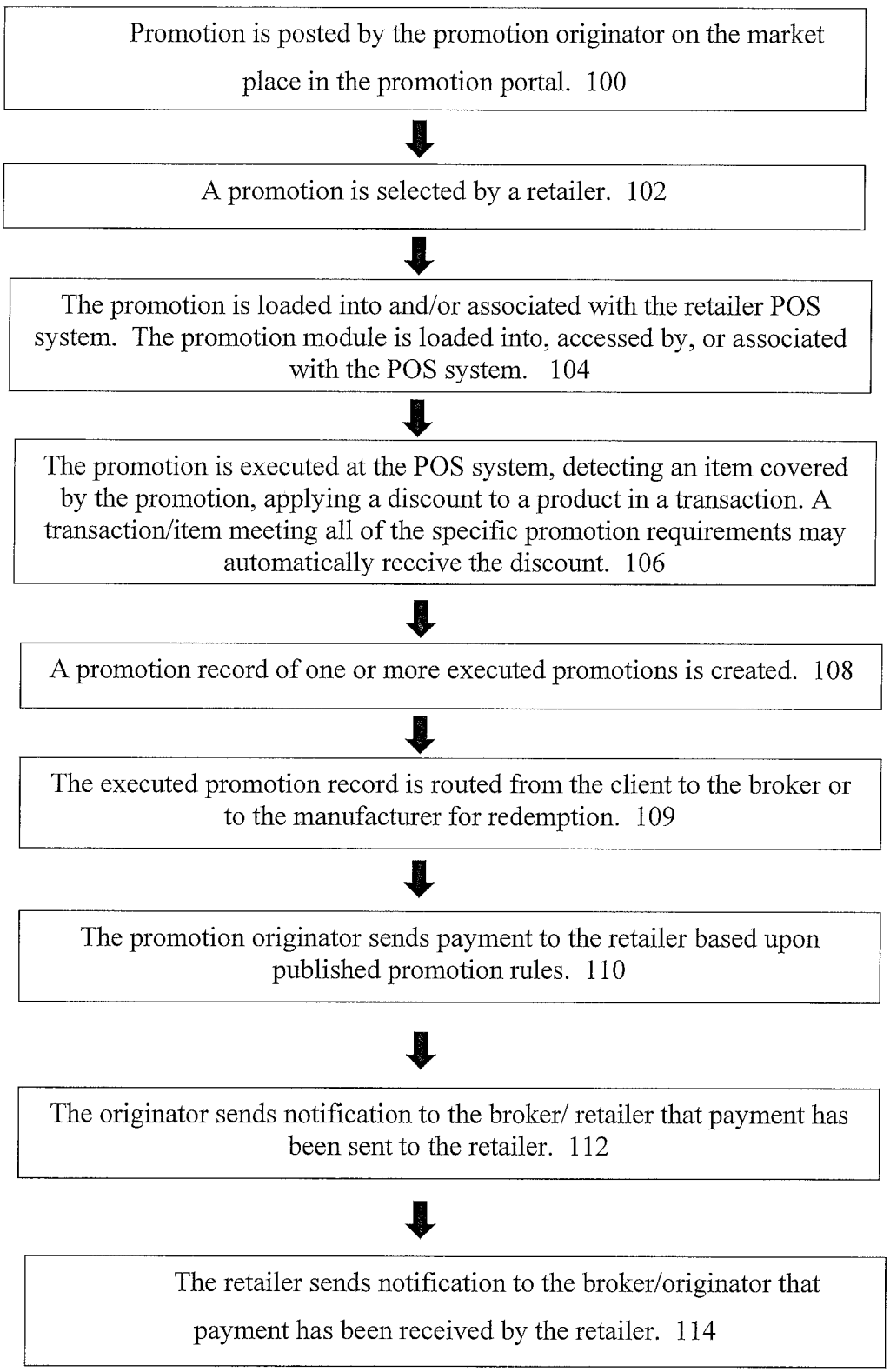
FIG. 4 is an illustration of examples of a checkout system including a manufacturer promotion and reimbursement transaction according to one embodiment of the disclosure.

In one example, shown generally in FIG. 3, a closed-loop system for managing manufacturer promotions and reimbursements includes a retailer host computer 60 and a POS checkout system 62 having a store database 61, wherein the store database is associated with a promotion module 68, a promotion record function 63 and a promotion reporting function 65. The promotion module 68 also includes an electronic promotion rules engine in communication with the POS checkout system. The promotion rules engine 67 executes electronic coupon triggers and associates an electronic coupon with a consumer purchase/purchase item when certain rules have been met within the POS system and promotion rules engine 67. The engine 67 also internally monitors the applicability of the associated electronic coupon to the particular product. An error detection module 43 may report, correct, and/or record any errors detected. Also included in this example is a communication component 69 for informing a manufacturer, distributor 92 or originator of the promotion 90 about a completed/executed promotion record 84 from a retailer system 60 needing reimbursement and a redemption component 91 for payment notification from the manufacturer to the retailer 60 for a particular promotion record.

In other examples, a web site includes a market place 70 or "promotion portal" with a collection of discounts, such as, coupons and/or buy-down programs, collectively herein referred to as "promotions" 72. Manufacturers 90/92 may include a promotion offer on the market place 70. A retailer 60 may access the market place 70 and view available promotions 72, such as, a buy-down promotion, offered by various manufacturers and distributors and included in the market place. From the market place 70, retailers 60 are able to select their chosen promotion 72 to implement in their store location. The market place 70 is able to be accessed and in communication with the store POS system 62 so that once the promotions 72 are selected, the systems retail POS system 62 is automatically loaded with or configured to be in communication with a promotion module 68 having the needed information to execute the promotions 72 and prepare a reimbursement record.

The consumer may, in some examples, automatically receive a particular discount at the time of purchase. The promotion module 68 is in communication with the POS system 62 and detects and records the discount transaction and/or item. The manufacturer is notified, for example electronically or by reported data, that the discount was indeed passed to the consumer, at the time of purchase. The manufacturer is then able to reimburse the retailer for the amount of the discount provided to the consumer.

In this example, the consumer does not have to collect, store or redeem a coupon of any type. The manufacturer/distributor 90/92 can be assured that the discount was provided to the consumer, affectively buying down the cost of the item, in order to directly stimulate purchases. The retailer 60 can lower the price of goods, in attempts of stimulating more purchases, while at the same time keeping profit margins the same as if no discount was provided. The retailer 60 is not required to manually record and report the amounts discounted, as the system performs this task, thus automating the redemption process and saving the retailer time, manpower steps and money.

In other examples, the promotions 72 available in the market place 70 could be associated with particular requirements in order for the promotion 72 to be accessed and available through the promotion module 68. For example, in one promotion 72, a retailer 60 may have to purchase from a specific supplier in order to qualify for the manufacturer's promotion. In another example, a manufacturer could set a requirement that, in order to qualify for the promotion, the retailer must buy directly from the manufacturer. In other examples, the manufacturer 90 may require that the retailer 60 collect in the POS system 60 customer details, for example customer phone number, age, preferences, etc., and that portions or all of the customer detail be provided back to the manufacturer in order to get the promotion reimbursement.

The market place/promotion portal 70 allows manufacturers to post promotions 72 and/or rules for each item. The rules can stipulate specific requirements, such as pre-purchase quantities that must be met by the retailer prior to the discount becoming active in the POS system 62 or may specify certain requirements to receive reimbursement for an applied promotion. The retailer 60 may select from varying promotions 72 being offered in one place with varying requirements for promotion reimbursements to determine which promotion 72 best fits with the retailer environment and merchandise.

In some scenarios, there may be two primary parties, the promotion originator 90 that normally is the manufacturer, but could also be the distributor 92. The second party typically is the retailer 60. Generally, there is an intermediary or promotion broker 80 within the promotion module 68, or associated with the promotion module 68, serving as an internet based system which arranges and facilitates the movement of data, records, billing, and reimbursement between the promotion originator 90 and the retailer 60. The promotion module 68 also may include a POS Requirement client component 64 that provides the business logic to the POS system, usually at the time of purchase, to insure rules associated with the downloaded promotion are fully adhered to by the POS system. In this way, the promotion originator 90 is assured that discounts will only be provided to consumers when all of the promotion originators requirements have been met and payment reimbursement sent to retailers 82 occurs only after pre-set rules have been satisfied.

Still other examples disclosed may include a system for documenting and/or crediting a promotion reimbursement to a promotion reimbursement account. This system may include a host computer with a programmable processor 40 and storage unit 61. An item for purchase from a retail store includes an item identification information. The item identification is associated with a promotion reimbursement program account file stored in the storage unit 61 of the host computer. The system also includes an item identification information reader, such as a scanner, and a point of sale device. The item identification reader is in communication with the point-of-sale device and is configured to receive the item identification information from the item for purchase at the time of making a purchase transaction at the point-of-sale device. The point-of-sale device is configured to form a promotion record unique to the purchase transaction by combining one or multiple of the item identification information with a purchase transaction detail. The transaction detail may be one or more of the information associated with the checkout transaction. The point-of-sale device may further be in communication with a host computer that is configured to receive a promotion record. The promotion record may be of and individual item, may be of related items, may be of items from different promotions related to the same originator and/or, by way of example, may be for one promotion or for a determine time period. The programmable processor is configured to determine the item for purchase's identification information contained in the promotion record, determine the promotion reimbursement account file that is associated with the item identification information according to predetermined promotion conditions and rules, based upon the promotion selected by the retailer, and promotions reimbursement programs in the promotion reimbursement account file. The system may allow a merchant to (a) identify prior to the purchase transaction a promotion program item for purchase, (b) apply a selected promotion to the purchase transaction, (c) record the applied promotion in an executed promotion reimbursement file record associated with a promotion originator, and (d) route an executed promotion record that is associated with a promotion originator to the originator.

In operation, in one embodiment, the promotion is posted by the promotion originator on the market place in the promotion portal 100. A promotion is selected by a retailer 102. The promotion is loaded into and/or associated with the retailer POS system 104. The promotion broker electronically sends the promotion to the POS client 104, for example, by storing the promotion rules and business logic at the POS, for example in a POS requirement component, so that the system is not dependent on web access to function, allowing the promotion system to work off-line. The promotion is executed at the POS system 106 applying a discount to a product in a transaction. A transaction meeting all of the specific promotion requirements may automatically receive the discount 106. A promotion record is generated 108. The executed promotion is electronically routed from the client, to the broker and/or to the manufacturer/originator, for redemption 109. The promotion originator sends payment to the retailer, based upon published promotion rules 110. The originator sends electronic notification to the broker/retailer that payment has been sent to the retailer 112. The retailer sends electronic notification to the broker/originator that payment has been received by the retailer 114.

In other examples, the Broker automatically picks up data from an originator and places a promotion on the market place. The promotion may be executed from a web shopping cart. The originator may use a prescribed XML, or other type of electronic document, to upload promotion requirements directly to the market place. The retailer may select a web ad, which directs the retailer to the specific buy down within the market place. The advertisement could be placed within the retailers own purchasing system, making it easy for a buyer to learn and find the promotion.

The originator may pay an inteimediary broker and the inteimediary broker, in-turn, pays the retailer. The broker may take a portion of payment from the retailer as payment for services rendered. The broker may add an additional fee/fees to a redeemed amount. The additional fee collected by the broker may be retained and the original redeemed amount sent to the retailer.

In some examples, the promotion may not located at the POS but instead be served up remotely by a web service. An Automated Clearing House (ACH) may be used by the originator, for example, to pay the broker and or retailer. An Automated Clearing House (ACH) may be used by the broker to pay the retailer. The broker may retain a retailers buying history and this history may be used by a client to determine if the retailer has met buying requirements, before executing a promotion for a consumer or before executing reimbursement payment.

In examples where a client calls a broker to check a retailers buying history, web access may be required at the time of transaction. Where a broker uploads, on a scheduled basis, a retailers buying history, web access is not typically required at time of transaction. The broker may be designed to upload to a multitude of POS manufacture types. The Broker may use secure credentials and or authorization certificates to exchange data securely with a multitude of POS manufacture types. The Broker may be programmed to use various data for formatting standards, such as XML, EDI, ASCII, to bi-directionally exchange data between the originator and retailer. The broker can be programmed to pick up and deliver such electronic documents in a manner to meet the requirements of various POS manufacturer types.

Promotion rules can be simple or also complex and can vary between manufacturers. By way of example, some of the promotion rules may include: a Can Purchase from any Supplier function, allowing the originator to authorize the retailer to purchase from any available distribution supply chain, a specific quantity between two dates; Must Purchase from a specific Supplier function, allowing the originator to require that the retailer purchase from a specific supplier, a specific quantity between two dates; a must Purchase from the Originator function, allowing the originator to require that the retailer purchase from the originator, a specific quantity between two dates; a must also Purchase Y to Receive X Buy Down function, requiring the consumer to buy a specific quantity of Y item when they buy X item to receive a buy down on X; a must buy a specific quantity function, requiring the consumer to buy a specific quantify of a specific item to receive buy down; a must agree to share transaction details function, requiring a retailer to share the complete transaction detail with the originator; a must agree to share customer detail function, requiring the retailer to share specific information on the customer, such as mailing address, what was in the order, and/or past purchase history. Other functions are also considered within the scope of this disclosure and the ones listed above are only exemplary of contemplated functions that may be incorporated.

Applicant's inventions may be applicable to improvements in traditional attended checkouts, self-checkouts, hybrid checkout scenarios, paystation environments and online shopping. Applicant's inventions smooth the transition between attended checkouts, traditional self-checkouts and the increased speed and changes to the checkout process occurring at hybrid, for example, scan tunnel and paystation, self-checkout environments by streamlining the coupon redemption, recordation and reimbursement process.

Certain modifications and improvements will occur to those skilled in the art upon a reading of the foregoing description. It should be understood that all such modifications and improvements have been deleted herein for the sake of conciseness and readability but are properly within the scope of the following claims.

I claim:

1. A checkout apparatus, comprising:
a vertically arranged checkout kiosk having a customer interface atop a kiosk housing including a bagging station projecting on one side, a transaction shelving center projecting on an opposite side and a centrally located scanner between the bagging station and an item load area for inputting an item for purchase into a checkout transaction;
a host computer with a programmable processor and storage unit in communication with the kiosk;
a point-of-sale checkout system operating in conjunction with the host computer;
the item for purchase from a retail store comprising an item identification information readable by the centrally located scanner and passed to the point-of sale-checkout system, wherein the item identification information is parsed to recognize if the item for purchase is associated with a discount promotion, and to produce both an entry record on a transaction listing and an entry record on a promotion reimbursement listing for items identified as associated with the discount promotion, and wherein the promotion reimbursement listing for items is associated with a promotion reimbursement program account file stored in the storage unit of the host computer;
the point-of-sale system including an internal promotion module in communication with and integrated from a market place having a listing of the available discount promotions from a promotion portal and housing the promotion reimbursement listing such that when a retailer selects one of the available discount promotions from the portal, the promotion module integrates from the market place to the point-of-sale system to operate internally within the point-of-sale system;
the point of sale system thereafter comprising a requirements rules engine including:
an internal retailer promotion selection option resulting in an activation of one of the discount promotions,
a promotion recordation component providing the entry record on the promotion reimbursement listing,
a promotion reimbursement component associated with the promotion recordation component to provide the promotion reimbursement program account file,
a redemption component associated with the promotion reimbursement component to formulate a redemption request record for a redemption payment,
wherein the programmable processor is configured to match the item for purchases item identification information with an item contained in an activated discount promotion listing, determine a promotion reimbursement program account file that is associated with the item identification information according to a predetermined promotion set of conditions, and determine the discount promotions reimbursement programs in the promotion reimbursement account file;
wherein the point-of-sale system with the integrated promotion module is configured for a merchant in an internal, closed-loop point-of-sale interaction to;
(a) identify, prior to the purchase transaction a promotion program item for purchase,
(b) apply a selected promotion to the purchase transaction,
(c) record the applied promotion in an executed promotion reimbursement file record associated with a promotion originator, and
(d) route an executed promotion record that is associated with a promotion originator to the originator as a billing for an executed promotion reimbursement
wherein the promotion record is created within the point-of-sale system and shareable between the retailer and an originator by way of the promotion portal, the promotion module, and the closed-loop point-of-sale interaction within the point-of-sale system to ensure the promotion originator that discounts will only be provided when all of the promotion originator's requirements have been met.

2. The checkout apparatus of claim 1 wherein the checkout kiosk is a self-checkout station.

3. The checkout apparatus of claim 2 further including a portal scanner.

4. The checkout apparatus of claim 2 further including a pay station.

5. A checkout apparatus for managing reimbursements from originator promotions, comprising:
a checkout kiosk having a customer interface atop a kiosk housing including a bagging station projecting on one side, a transaction shelving center projecting on one side and a centrally located scanner between the bagging station and an item load area for inputting an item for purchase into a checkout transaction;
a host computer with a programmable processor and storage unit in communication with the kiosk;
a point-of-sale checkout system in communication with the kiosk and having a store database, wherein the point-of-sale checkout system includes a point-of-sale programming to recognize an item for purchase, to process a shopping transaction, to accept payment for the shopping transaction and to complete the shopping transaction, and the point-of-sale checkout system also includes an integrated promotion module, a promotion record and a reimbursement module;

a promotion portal linked directly to the point-of-sale checkout system, the promotion portal including a listing of discount promotions available to a retailer from an originator;

the promotion portal including a promotion module that is made integral with the point-of-sale system upon a retailer's selection of a promotion from the promotion portal, the promotion portal configuring the point-of-sale system to include:

a requirements rules engine in communication with the point-of-sale checkout system for executing promotion triggers and to associate the promotion with a product that is one of the items for purchase within the POS system, wherein the engine is configured to internally monitor the applicability of the associated product to the promotion, a recordation component in the promotion module for providing the promotion record and a listing of an executed promotion and the associated items for purchase, a communication component for informing the originator about the executed promotion within the record, and a redemption component for claiming payment from the originator to the retailer, wherein a POS requirement client component includes programming to verify directly between the retailer and the originator, by way of the promotion module, that discounts will only be provided to consumers when all of a promotion originator's requirements have been met and reimbursement occurs only after pre-set rules have been satisfied, the verification being possible because the promotion module is housed within the point-of-sale system.

6. The system of claim 5 wherein the checkout kiosk is a self-checkout.

7. The system of claim 6 wherein the checkout system is a hybrid checkout system.

8. The system of claim 5 wherein the checkout kiosk is remotely accessed by a consumer shopping online.

* * * * *